(12) United States Patent
Lille et al.

(10) Patent No.: US 8,035,922 B2
(45) Date of Patent: Oct. 11, 2011

(54) WRITE HEAD WITH INTEGRATED COIL AND SHIELD STRUCTURE

(75) Inventors: Jeffrey S. Lille, Sunnyvale, CA (US);
Petrus A. Van Der Heijden, San Jose, CA (US)

(73) Assignee: Hitachi Global Storage Technologies Netherlands, B.V., Amsterdam (NL)

( * ) Notice: Subject to any disclaimer, the term of this patent is extended or adjusted under 35 U.S.C. 154(b) by 632 days.

(21) Appl. No.: 12/194,168

(22) Filed: Aug. 19, 2008

(65) Prior Publication Data

US 2010/0046120 A1    Feb. 25, 2010

(51) Int. Cl.
*G11B 5/127* (2006.01)
(52) U.S. Cl. ................................... 360/123.06
(58) Field of Classification Search ............. 360/123.06
See application file for complete search history.

(56) References Cited

U.S. PATENT DOCUMENTS

| | | | |
|---|---|---|---|
| 5,196,976 A | 3/1993 | Lazzari | |
| 6,404,575 B1 | 6/2002 | Yen | |
| 6,665,136 B2 | 12/2003 | Clinton et al. | |
| 6,710,594 B2 | 3/2004 | Eunkyu et al. | |
| 6,943,992 B2 | 9/2005 | Lin | |
| 7,292,414 B1 | 11/2007 | Mallary | |
| 7,367,110 B2* | 5/2008 | Cyrille et al. | 29/603.12 |
| 7,382,587 B2* | 6/2008 | Pinarbasi | 360/324.11 |
| 7,468,862 B2* | 12/2008 | Sasaki et al. | 360/125.02 |
| 2005/0243478 A1* | 11/2005 | Pinarbasi | 360/324.11 |
| 2007/0064353 A1* | 3/2007 | Heim et al. | 360/324.12 |
| 2007/0146929 A1 | 6/2007 | Maruyama et al. | |
| 2008/0094759 A1* | 4/2008 | Han et al. | 360/319 |
| 2008/0158736 A1* | 7/2008 | Cyrille et al. | 360/319 |
| 2009/0310262 A1* | 12/2009 | Wu et al. | 360/319 |

* cited by examiner

*Primary Examiner* — Mark Blouin
(74) *Attorney, Agent, or Firm* — Duft Bornsen & Fishman, LLP

(57) ABSTRACT

Disk drive systems and associated methods of fabrication are disclosed for a write head having an integrated coil and shield structure. The write head includes a write pole having a pole tip adjacent to an air bearing surface, and a return pole having a surface adjacent to the air bearing surface. The write pole and the return pole are connected to one another by a back gap section that is distal from the air bearing surface. The write head also includes a coil formed from electrically conductive materials. The coil includes a segment that is formed proximate to the air bearing surface. The coil segment is formed from a ferromagnetic material so that the coil segment acts as a shield for the write pole.

25 Claims, 14 Drawing Sheets

WRITE HEAD WITH INTEGRATED COIL AND SHIELD STRUCTURE

BACKGROUND OF THE INVENTION

1. Field of the Invention

The invention is related to the field of magnetic recording and, in particular, to a write head of a disk drive system that has an integrated coil and shield structure.

2. Statement of the Problem

Magnetic disk drive systems are used in a variety of electrical devices for mass storage of information. The disk drive systems include a hard disk and an assembly of write and read heads. The assembly of write and read heads is supported by a slider that is mounted on a suspension arm. The suspension arm biases the slider toward the hard disk. When the hard disk rotates, an air flow generated by the rotation of the hard disk causes the slider to fly on a cushion of air at a very low elevation (fly height) over the hard disk. When the slider rides on the air, the actuator moves the suspension arm to position the write and read heads over selected data tracks on the hard disk. The write and read heads write data to and read data from, respectively, data tracks on the hard disk. Processing circuitry connected to the write and read heads then operates according to a computer program to implement writing and reading functions.

A write head typically has the structure of a write pole, a return pole, and a back gap section. A coil is wrapped around the write pole or the back gap section, and when current is applied through the coil, a magnetic flux is induced in the write pole which is used to write to the hard disk. There are two types of coils that are typically used in a write head. One type of coil is a spiral coil that is flat on a single plane. The spiral coil begins at an inner radius and loops outwardly to larger radii. Each loop of the spiral coil is referred to as a turn. Another type of coil is a helical coil. A helical coil has a three-dimensional structure where the loops wrap as if around the surface of a cylinder (even though the loops may not have a perfect circular shape).

The write pole has a pole tip proximate to an air bearing surface (ABS) of the write head. Magnetic recording generally takes place from the trailing side and the two track sides of the pole tip, and no recording generally takes place from the leading side of the write pole. To prevent writing to neighboring bits along the track and to neighboring tracks, a wrap around shield (WAS) may be fabricated proximate to the trailing side of the pole tip and to the two track sides of the pole tip. The wrap around shield shunts the magnetic fields emitting from the trailing and the two track sides of the pole tip. Because the trailing side of the pole tip is primarily responsible for recording, the wrap around shield helps sharpen the field gradient of the magnetic fields as well as prevents writing to neighboring bits. Manufacturers of disk drive systems continually strive to find better and more efficient ways to fabricate write heads for disk drive systems. As areal density increases, the need for higher coercivity media is needed to prevent superparamagnetic loss of data.

SUMMARY OF THE SOLUTION

Embodiments of the invention comprise write heads and associated methods of fabrication where the coil in the write head also acts as a shield for the write pole. According to one embodiment, a write head includes a write pole having a pole tip adjacent to an air bearing surface, and a return pole having a surface adjacent to the air bearing surface. The write pole and the return pole are connected to one another by a back gap section that is distal from the air bearing surface. The write head also includes a coil formed from electrically conductive materials that is wrapped around the write pole or the back gap section. In order for the coil to act as a shield, a segment of the coil is fabricated proximate to the air bearing surface and to a trailing side of the pole tip. The coil segment is formed from a ferromagnetic material so that the coil segment acts as a shield (i.e., trailing shield or wrap around shield) for the write pole. Advantageously, the magnetic field produced by the current direction in the coil-shield structure enhances the field produced by the write pole which can write with higher coercivity when compared with a write head that does not have the coil-shield structure.

The invention may include other exemplary embodiments described below.

DESCRIPTION OF THE DRAWINGS

The same reference number represents the same element or same type of element on all drawings.

DETAILED DESCRIPTION OF THE INVENTION

FIGS. 1-17 and the following description depict specific exemplary embodiments of the invention to teach those skilled in the art how to make and use the invention. For the purpose of teaching inventive principles, some conventional aspects of the invention have been simplified or omitted. Those skilled in the art will appreciate variations from these embodiments that fall within the scope of the invention. Those skilled in the art will appreciate that the features described below can be combined in various ways to form multiple variations of the invention. As a result, the invention is not limited to the specific embodiments described below, but only by the claims and their equivalents.

Figure 1:
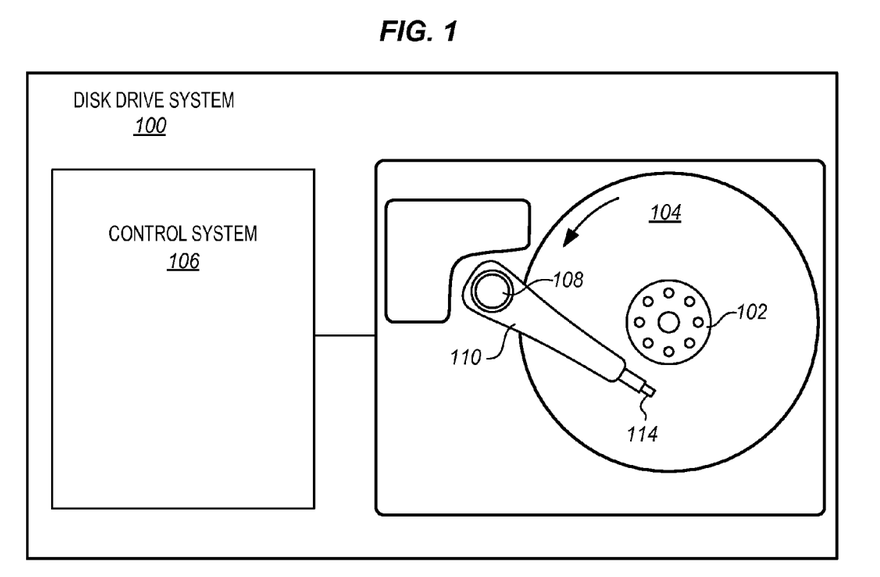
FIG. 1 illustrates a disk drive system.

FIG. 1 illustrates a disk drive system 100. Disk drive system 100 includes a spindle 102, a hard disk 104, a control system 106, an actuator 108, a suspension arm 110, and a slider 114 having an assembly of write and read heads. Spindle 102 supports and rotates hard disk 104 in a direction indicated by the arrow. A spindle motor (not shown) rotates spindle 102 according to control signals from control system 106. Slider 114 is mounted on suspension arm 110, and actuator 108 is configured to rotate suspension arm 110 in order to position the assembly of write and read heads over a desired data track on hard disk 104. Disk drive system 100 may include other components not shown in FIG. 1, such as a plurality of hard disks, actuators, suspension arms, and sliders.

When hard disk 104 rotates, an air flow generated by the rotation of hard disk 104 causes slider 114 to fly on a cushion of air at a very low elevation (fly height) over the rotating hard disk 104. As slider 114 flies on the air, actuator 108 moves suspension arm 110 to position a write head (not shown) and a read head (not shown) over selected data tracks on hard disk 104. The write and read heads write data to and read data from, respectively, data tracks on hard disk 104. Processing circuitry connected to the write and read heads then operates according to a computer program to implement writing and reading functions.

Figure 2:
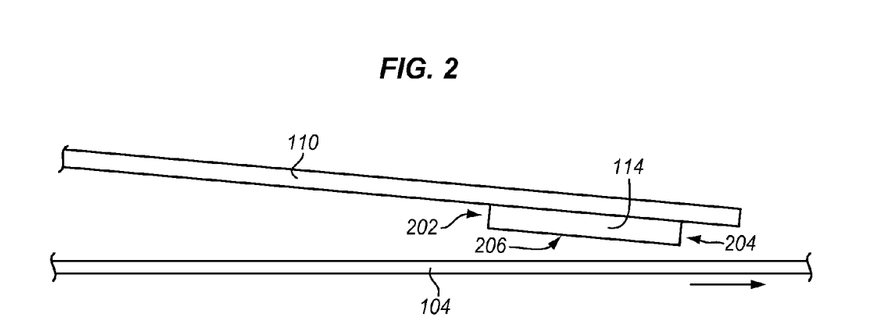
FIG. 2 is a side view of a disk drive system.

FIG. 2 is a side view of disk drive system 100. Slider 114 is supported above hard disk 104 by suspension arm 110. Slider 114 includes a front end 202 and an opposing trailing end 204. Slider 114 also includes an air bearing surface (ABS) 206 that faces toward the surface of hard disk 104. A write head (not shown) and a read head (not shown) are formed proximate to trailing end 204, which is further illustrated in FIG. 3.

Figure 3:
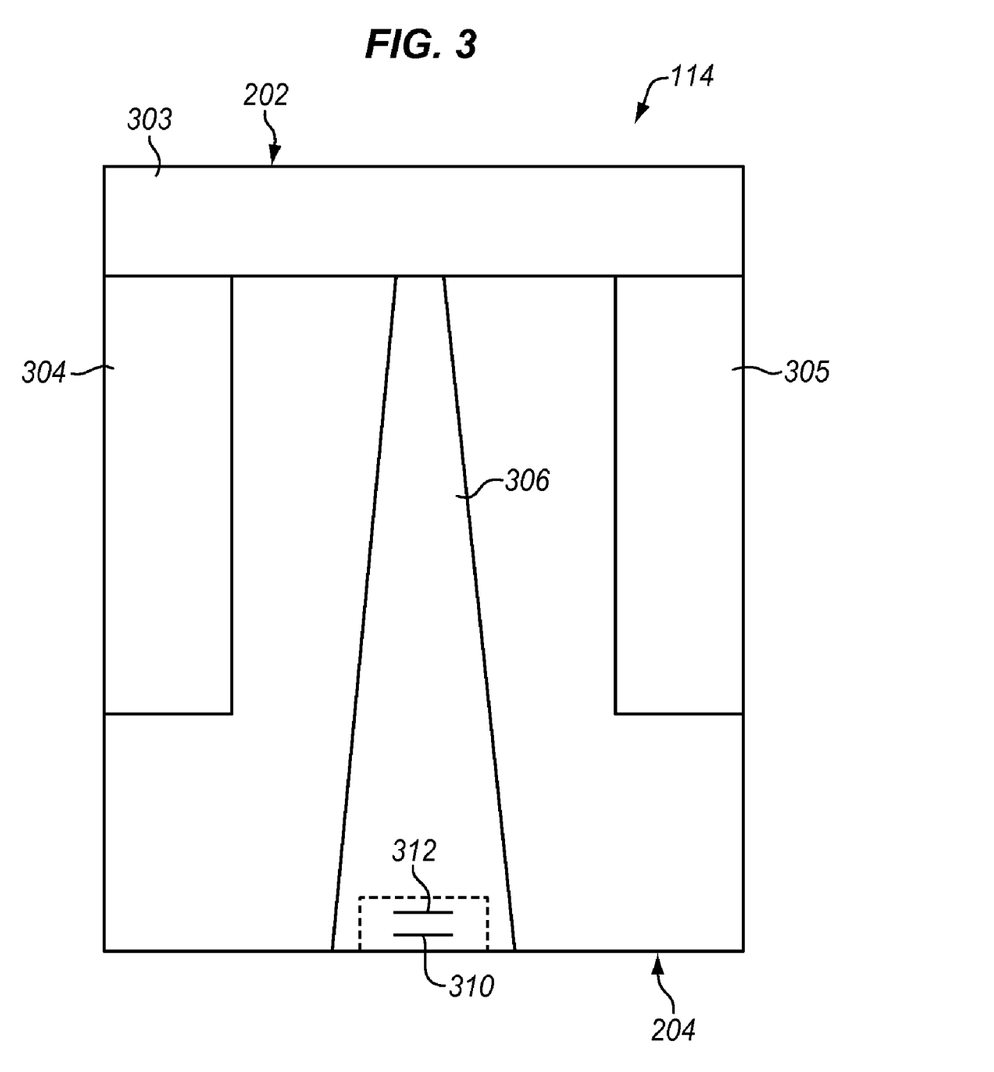
FIG. 3 is an ABS view of a slider of a disk drive system.

FIG. 3 is an ABS view of slider 114. The ABS 206 of slider 114 is the surface of the page in FIG. 3. Slider 114 has a cross rail 303, two side rails 304-305, and a center rail 306 on the ABS 206. The rails, which define how slider 114 flies over the surface of hard disk 104, illustrate just one embodiment, and the configuration of the ABS 206 of slider 114 may take on any desired form. Slider 114 includes a write head 310 and a read head 312 fabricated proximate to the trailing end 204.

Figure 4:
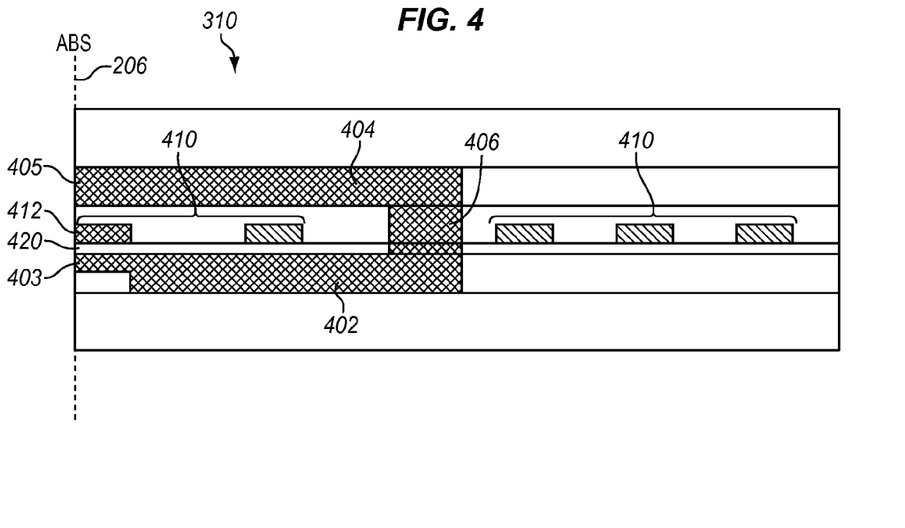
FIG. 4 is a cross-sectional view of a write head in an exemplary embodiment of the invention.

FIG. 4 is a cross-sectional view of write head 310 in an exemplary embodiment of the invention. In FIG. 4, the ABS 206 of write head 310 is to the left of the page. Write head 310 includes a write pole 402 and a return pole 404 connected to one another by a back gap section 406. Write pole 402 includes a pole tip 403 that is proximate to the ABS 206. Likewise, return pole 404 includes a surface 405 that is proximate to the ABS 206.

Write head 310 also includes a coil 410 that wraps around back gap section 406. Those skilled in the art will appreciate that although coil is illustrated as a spiral coil, coil 410 may alternatively comprise a helical coil in other embodiments. Also, coil 410 is illustrated as being wrapped around back gap section 406. In other embodiments, coil 410 may additionally or alternatively be wrapped around write pole 402 or return pole 404.

In this embodiment, coil 410 is fabricated so that a segment 412 of coil 410 is proximate to ABS 206 and is exposed at ABS 206. Coil segment 412 is formed from a ferromagnetic material, such as NiFe. The remaining portions of coil 410 are formed from a non-ferromagnetic material, such as Cu or Au. The ferromagnetic materials in FIG. 4 are illustrated with cross-hatching (e.g., coil segment 412) while the non-ferromagnetic materials are illustrated with slanted lines (e.g., coil 410). Due to the positioning of coil segment 412 at the ABS 206 and the ferromagnetic composition of coil segment 412, it acts as a shield for write pole tip 403. Coil segment 412 and pole tip 403 are separated by a thin layer of insulating material (e.g., alumina), which is also referred to as a shield gap 420. When in operation, coil segment 412 shunts the magnetic fields emitting from the trailing side (i.e., the top side) of pole tip 403. Although not evident in FIG. 4 due to the cross-sectional view, coil segment 412 may represent a pure trailing shield or a wrap around shield.

Figure 5:
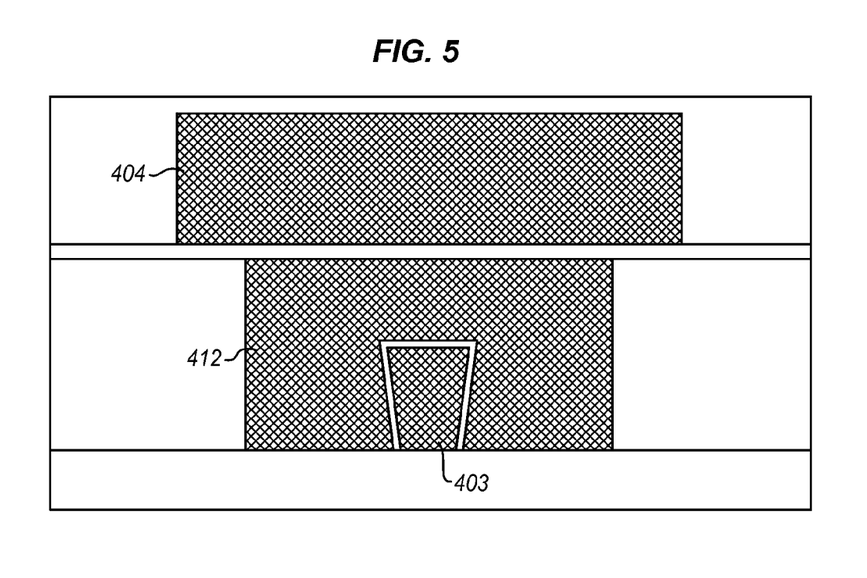
FIG. 5 is an ABS view of a write head illustrating a segment of a coil acting as a wrap around shield in an exemplary embodiment of the invention.

FIG. 5 is an ABS view of write head 310 illustrating coil segment 412 acting as a wrap around shield in an exemplary embodiment of the invention. The ABS 206 in FIG. 5 is the surface of the page. When coil segment 412 is deposited, coil segment 412 covers not only the top surface of pole tip 403 across the shield gap 420, but also covers the side regions of pole tip 403. Thus, coil segment 412 comprises a wrap around shield for pole tip 403.

Figure 6:
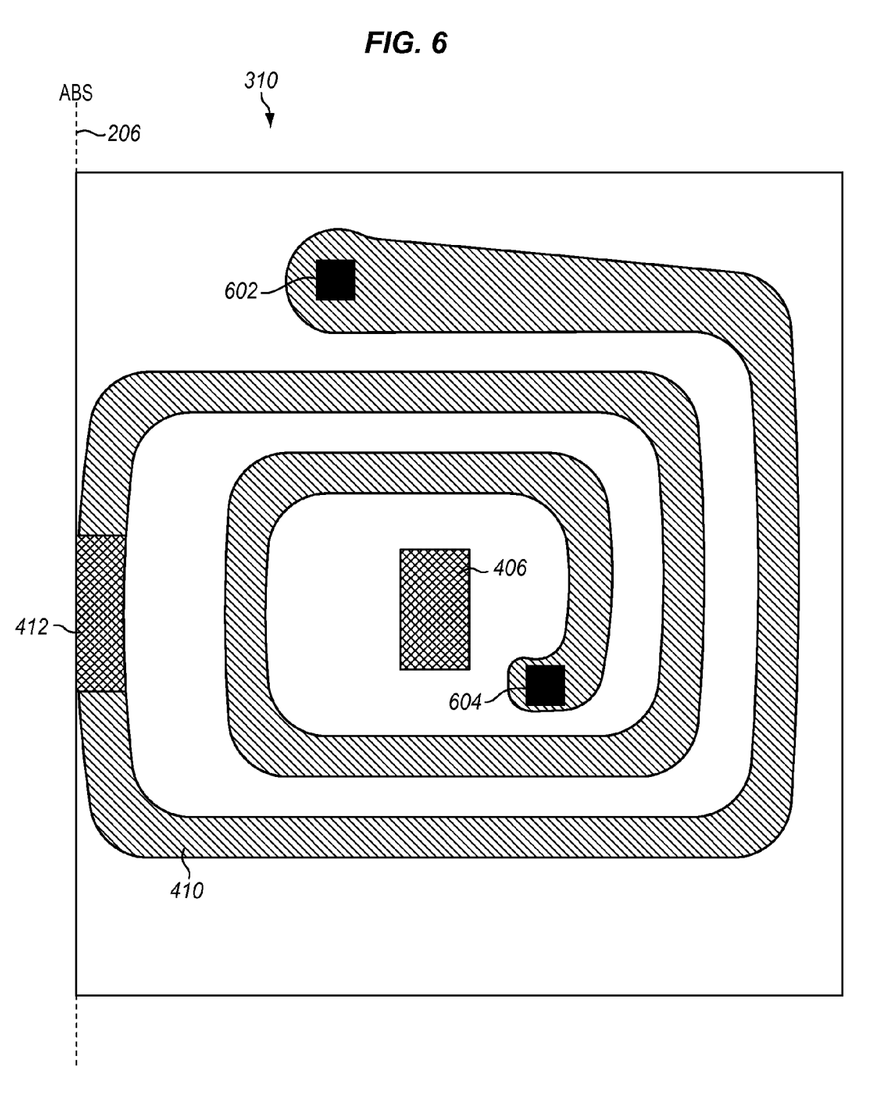
FIG. 6 is a top view of a write head showing a coil in an exemplary embodiment of the invention.

FIG. 6 is a top view of write head 310 showing coil 410 in an exemplary embodiment of the invention. Coil 410 is wrapped from an outer radius to an inner radius around back gap section 406. As is further illustrated in FIG. 6, coil segment 412 is fabricated proximate to ABS 206. In one embodiment, coil segment 412 is geometrically centered along the length of coil 410. In other words, if coil 410 were to be uncoiled in a straight line, coil segment 412 would be located in the center of the length of coil 410.

Coil 410 has an outer tap 602 and an inner tap 604. These taps 602 and 604 represent the connection points where a voltage is applied to inject a current through coil 410. Assume that a differential voltage is applied across taps 602 and 604, such as +1 volts on outer tap 602 and −1 volts on the inner tap 604. Because coil segment 412 is fabricated at the geometric center of coil 410, the net voltage at coil segment 412 should be very close to 0 volts so as to not promote corrosion at ABS 206.

Fabricating coil segment 412 in the geometric center of coil 410 may be difficult depending on how many windings there is for coil 410. As one can see in FIG. 6, the length of coil 410 from coil segment 412 to outer tap 602 could be limited as the length of coil 410 cannot extent much farther before it would contact ABS 206. Thus, to equalize the length of coil between coil segment 412 and outer tap 602 and between coil segment 412 and inner tap 604, one option is to fabricate a bridge structure to move the outer tap 602.

Figure 7:
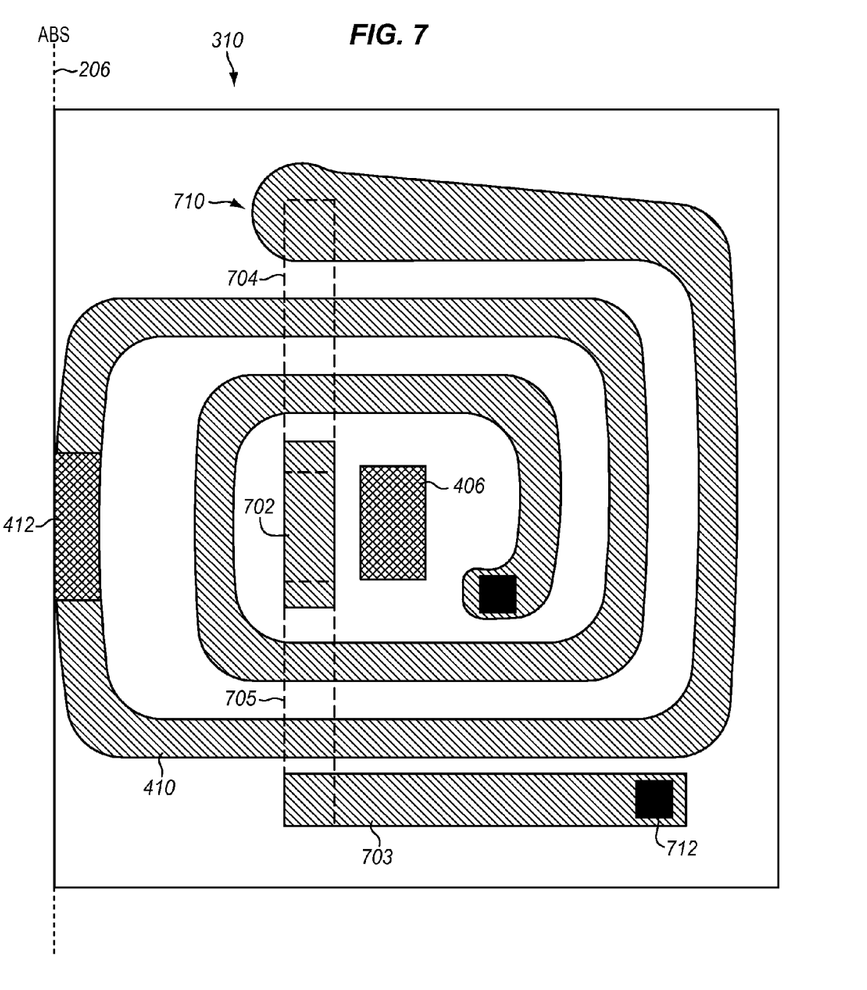
FIG. 7 is a top view of a write head with a bridge structure in an exemplary embodiment of the invention.

FIG. 7 is a top view of write head 310 with a bridge structure in an exemplary embodiment of the invention. The bridge structure is fabricated to electrically connect an outer end 710 of coil 410 to an outer tap 712 for coil 410 to extend the length of coil 410 between coil segment 412 and outer tap 712. Through the bridge structure, the coil segment 412 can be more effectively fabricated in the geometric center of coil 410.

The bridge structure is comprised of connecting traces 702-703 that are fabricated concurrently with coil 410 and on the same plane, and is also comprised of bridge traces 704-705 that are fabricated in a later step that are on a different plane than coil 410 so that there is no electrical connection with coil 410. Bridge traces 704-705 are illustrated in dotted lines to indicate that they are not on the same plane as connecting traces 702-703 and coil 410, and that they do not electrically contact coil 410 as there is a layer of insulating material between bridge traces 704-705 and coil 410. In FIG. 7, the topmost bridge trace 704 electrically contacts the outer end 710 of coil 410, and one end of the connecting trace 702 that is fabricated in the middle of coil 410. The bottommost bridge trace 705 electrically contacts the other end of connecting trace 702, and one end of the other connecting trace 703 that is fabricated along side of coil 410 (on the bottom in FIG. 7). The other end of connecting trace 703 comprises the new outer tap 712 for write coil 410.

Figure 8:
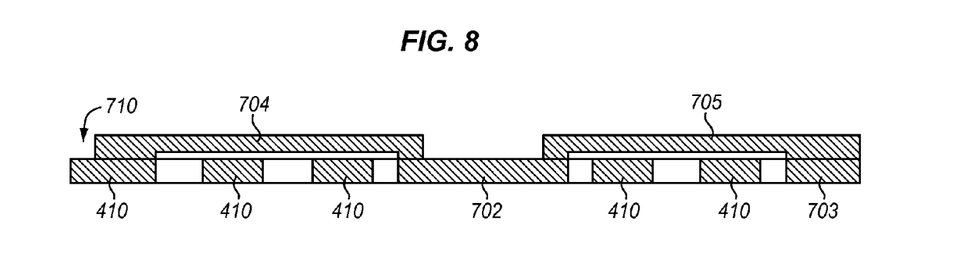
FIG. 8 is a cross-sectional view of the bridge structure in an exemplary embodiment of the invention.

FIG. 8 is a cross-sectional view of the bridge structure in an exemplary embodiment of the invention. Going from left to right in FIG. 8, bridge trace 704 electrically contacts the outer end 710 of coil 410, and one end of the connecting trace 702. There is a layer of insulating material between bridge trace 704 and the inner turns of coil 410 so that they are not in electrical contact. Bridge trace 705 electrically contacts the other end of connecting trace 702, and one end of connecting trace 703. Again, there is a layer of insulating material between bridge trace 705 and coil 410 so that they are not in electrical contact. Bridge traces 704-705 and connecting traces 702-703 define a conductive path over coil 410 from outer end 710 of coil 410 to outer tap 712 (see also FIG. 7).

Figure 9:
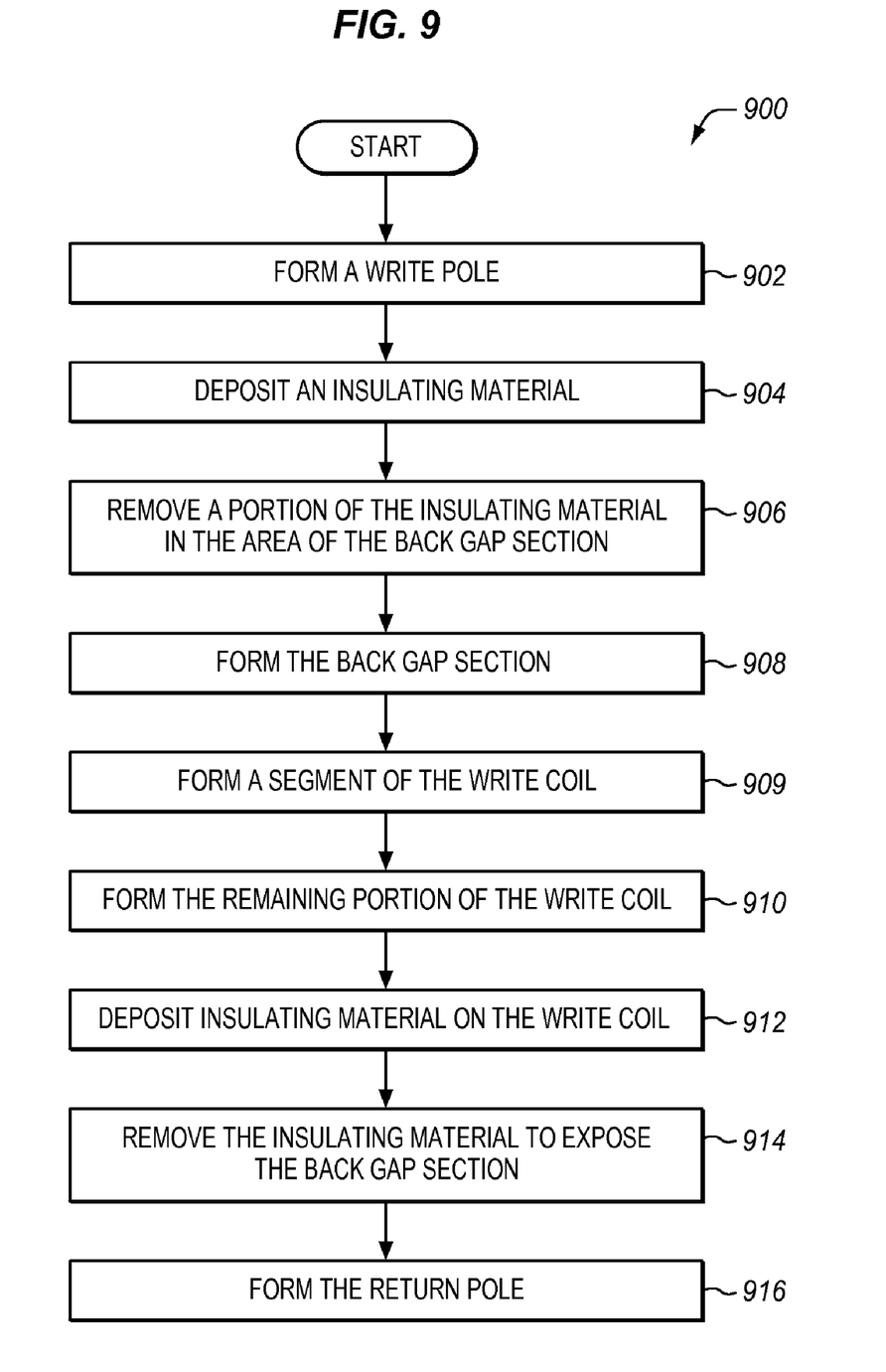
FIG. 9 is a flow chart illustrating a method of fabricating a write head in an exemplary embodiment of the invention.

FIG. 9 is a flow chart illustrating a method 900 of fabricating a write head in an exemplary embodiment of the invention. Method 900 is described below as forming part of the write head 310 as illustrated in FIG. 4, but method 900 may be used to form other write heads. Method 900 is also described as fabricating a single write head, although those skilled in the art will appreciate that the fabrication is actually performed at the wafer-level to create many write heads simultaneously.

Figure 10:
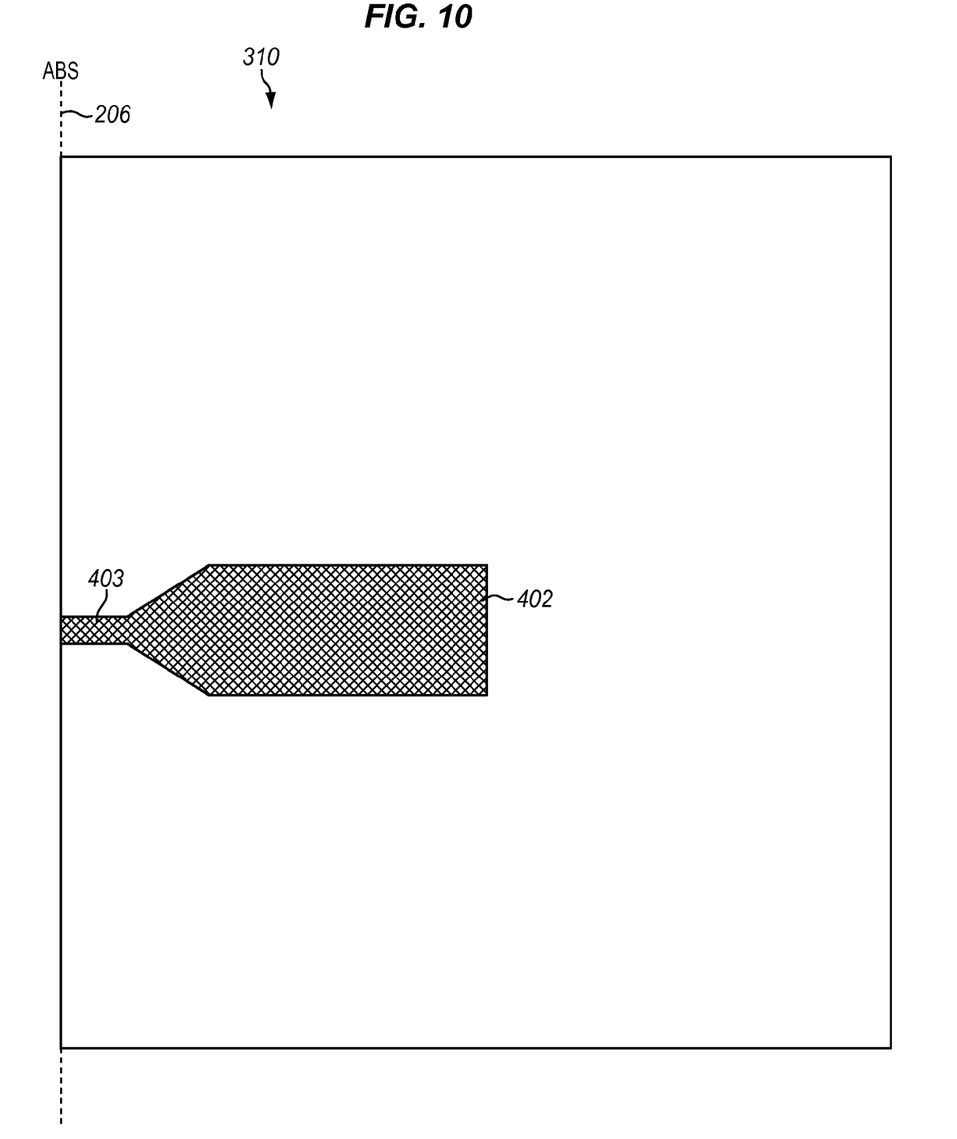
FIGS. 10-17 are top views of a write head being fabricated according to the steps of the method in FIG. 9.
Figure 11:
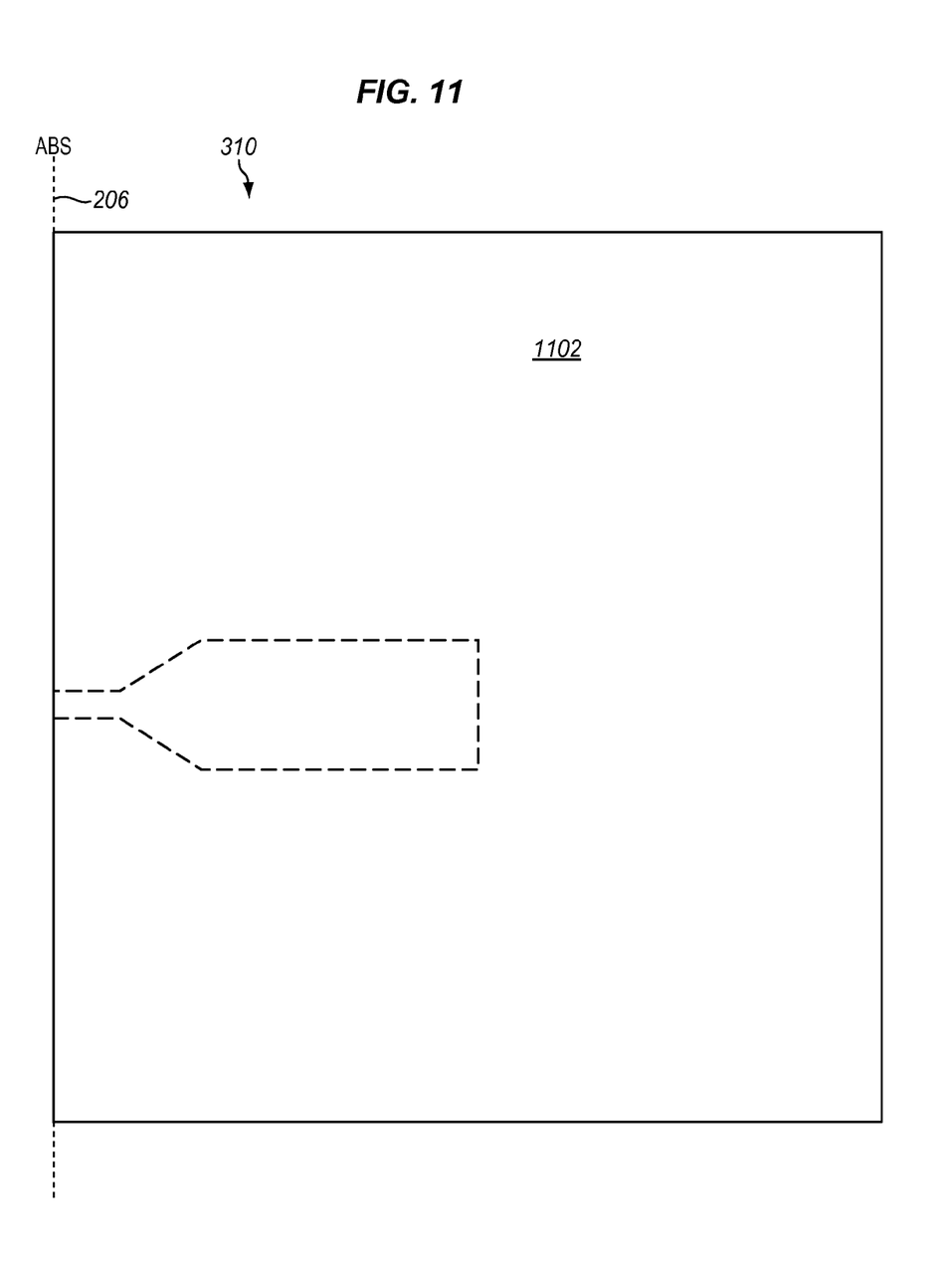
Figure 12:
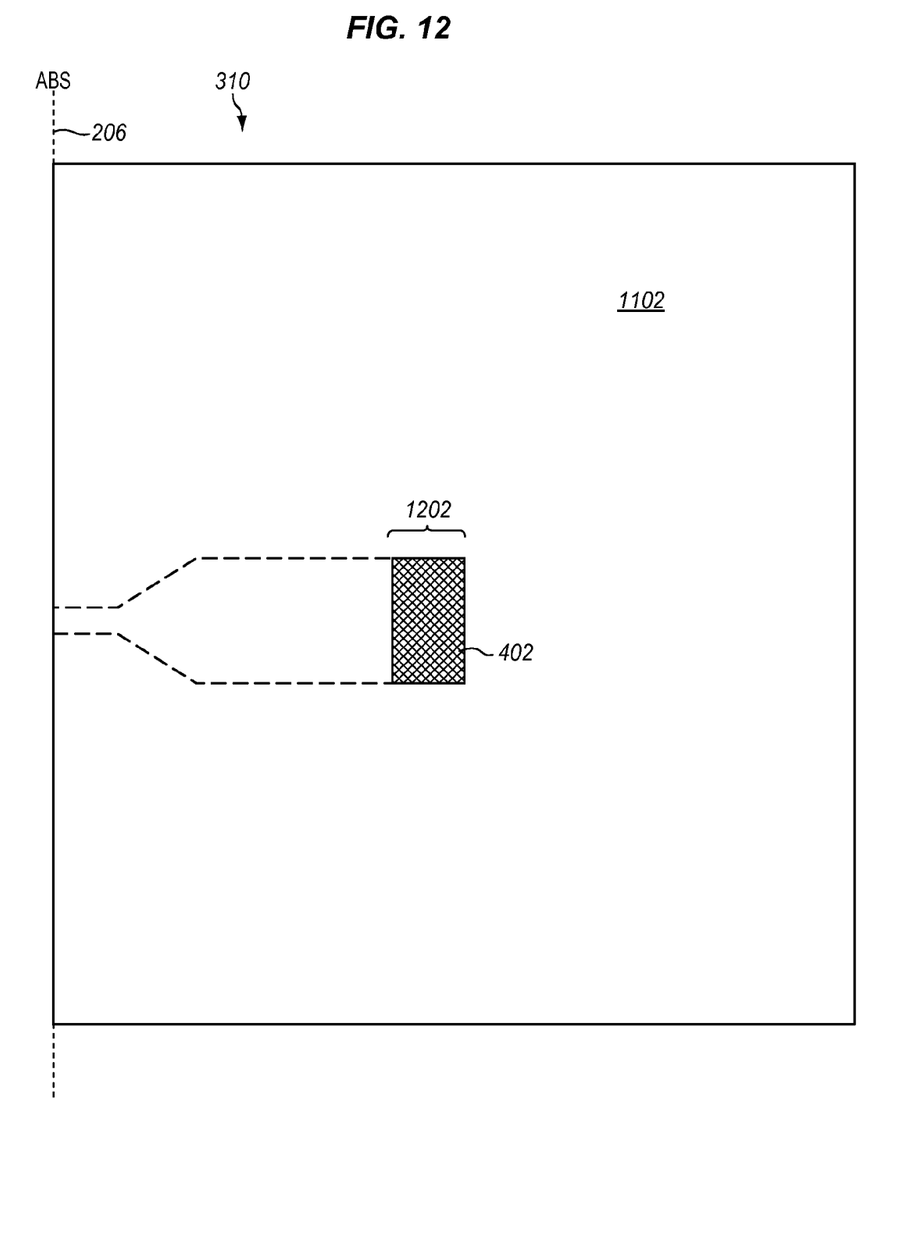

Step 902 comprises forming a write pole 402 for write head 310. FIG. 10 is a top view of write head 310 being fabricated according to step 902. Write pole 402 may be fabricated by plating a ferromagnetic material, such as NiFe or CoFe. Write pole 402 includes a pole tip 403 that will be proximate to the ABS 206 of write head 310 when write head 310 is subsequently lapped. Step 904 comprises depositing an insulating material 1102, such as alumina, on write pole 402. FIG. 11 is a top view of write head 310 being fabricated according to step 904. Write pole 402 is illustrated in dotted lines to indicate that the insulating layer 1102 is covering write pole 402. The thickness of the insulating material 1102 that is deposited on write pole 402 defines the shield gap 420 between pole tip 403 and the shield that will be deposited in a subsequent step (see also FIG. 4). Step 906 comprises removing the insulating material 1102 down to write pole 402 in the area of a back gap section 406. FIG. 12 is a top view of write head 310 being fabricated according to step 906. The removal of the insulating material 1102 may be performed by an etching process or similar process to expose write pole 402 in the area 1202 of back gap section 406.

Figure 13:
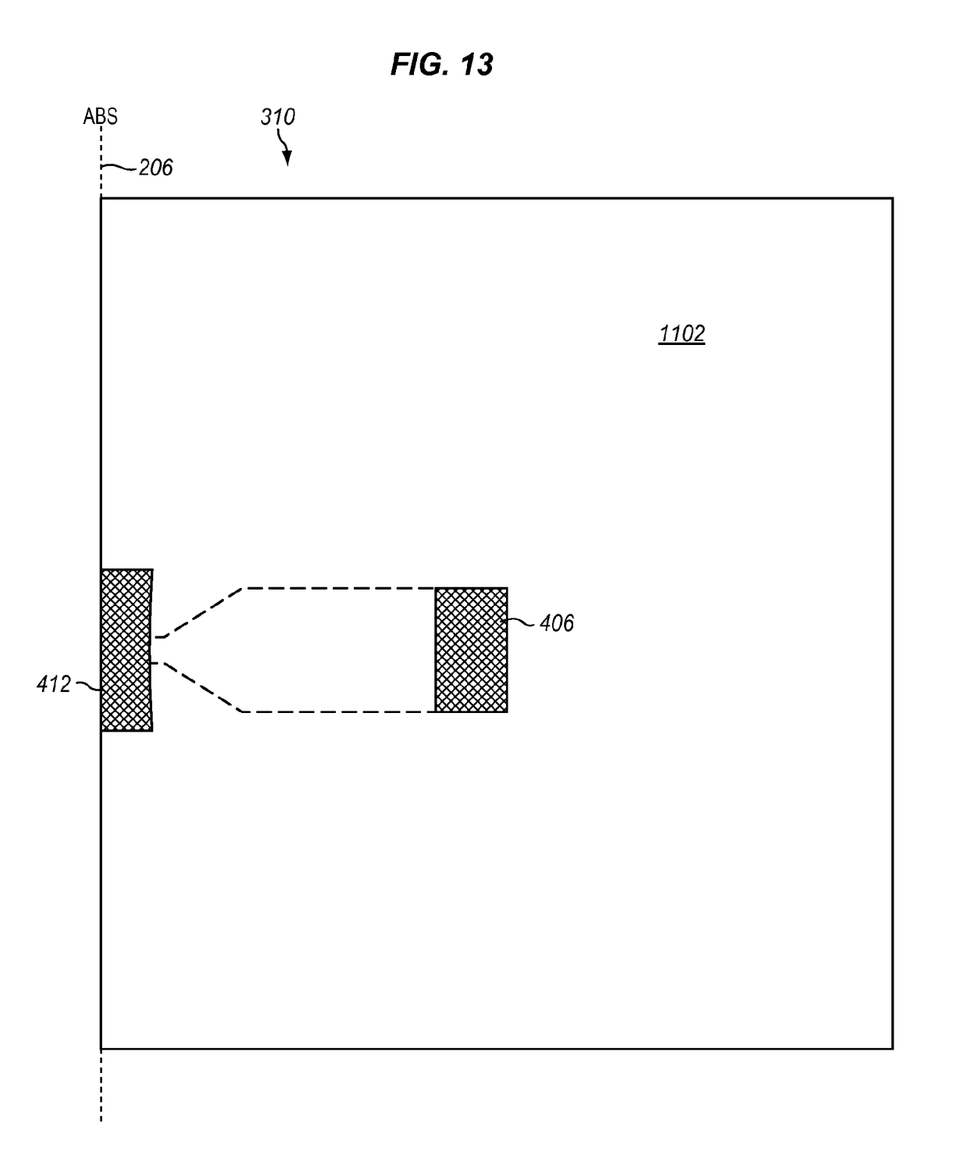
Figure 14:
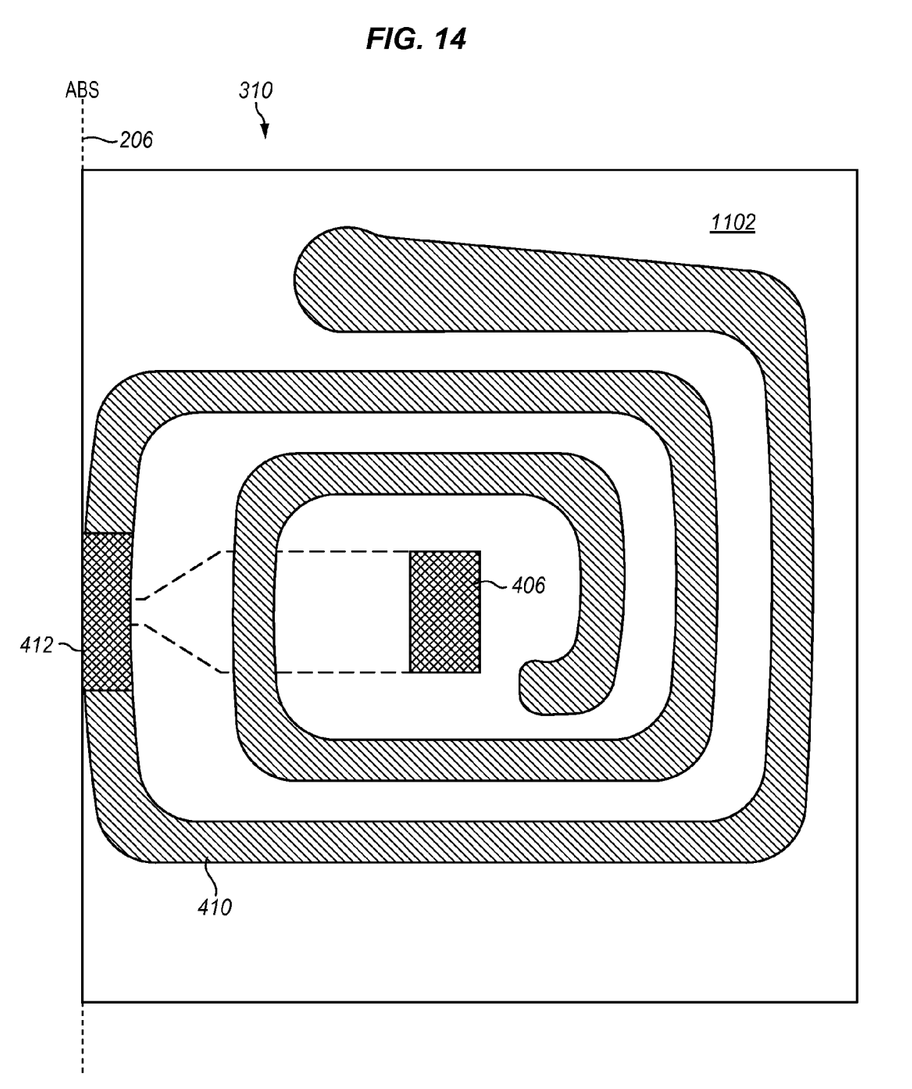

Step 908 comprises forming the back gap section 406. Step 909 comprises forming a segment 412 of coil 410 proximate to the ABS 206 of write head 310. FIG. 13 is a top view of write head 310 being fabricated according to steps 908-909. The coil segment 412 and back gap section 406 may be formed in the same process by plating a ferromagnetic material, such as NiFe. The coil segment 412 is proximate to the ABS 206 and acts as the shield for write pole 402. Step 910 comprises forming the remaining portion of the coil 410. FIG. 14 is a top view of write head 310 being fabricated according to step 910. The remaining portion of coil 410 may be formed by patterning a coil mask, plating Cu, Au, or another non-ferromagnetic material in the coil mask, and removing the coil mask. The non-ferromagnetic material electrically connects to coil segment 412 to complete coil 410. Steps 908-910 may be performed in any order. Thus, coil segment 412 may be fabricated before the remaining portion of coil 410, or the remaining portion of coil 410 may be fabricated before coil segment 412.

Figure 15:
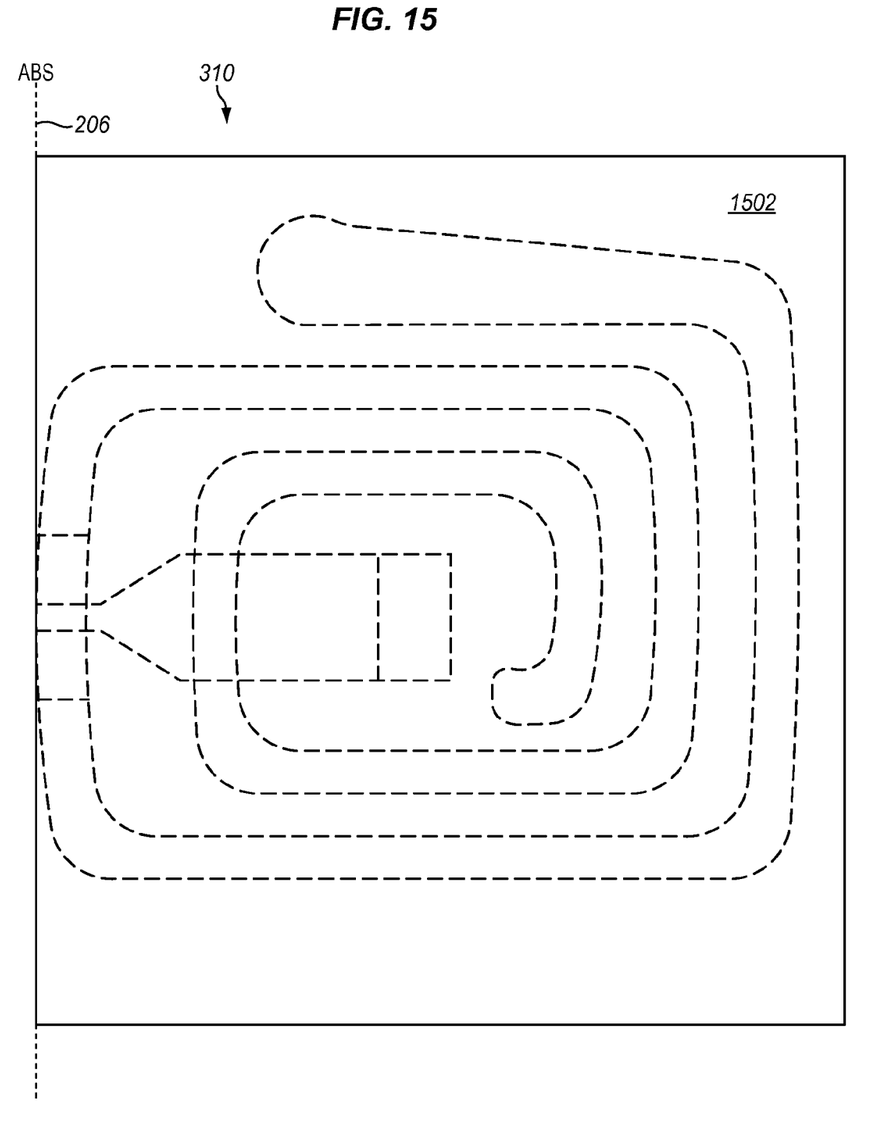
Figure 16:
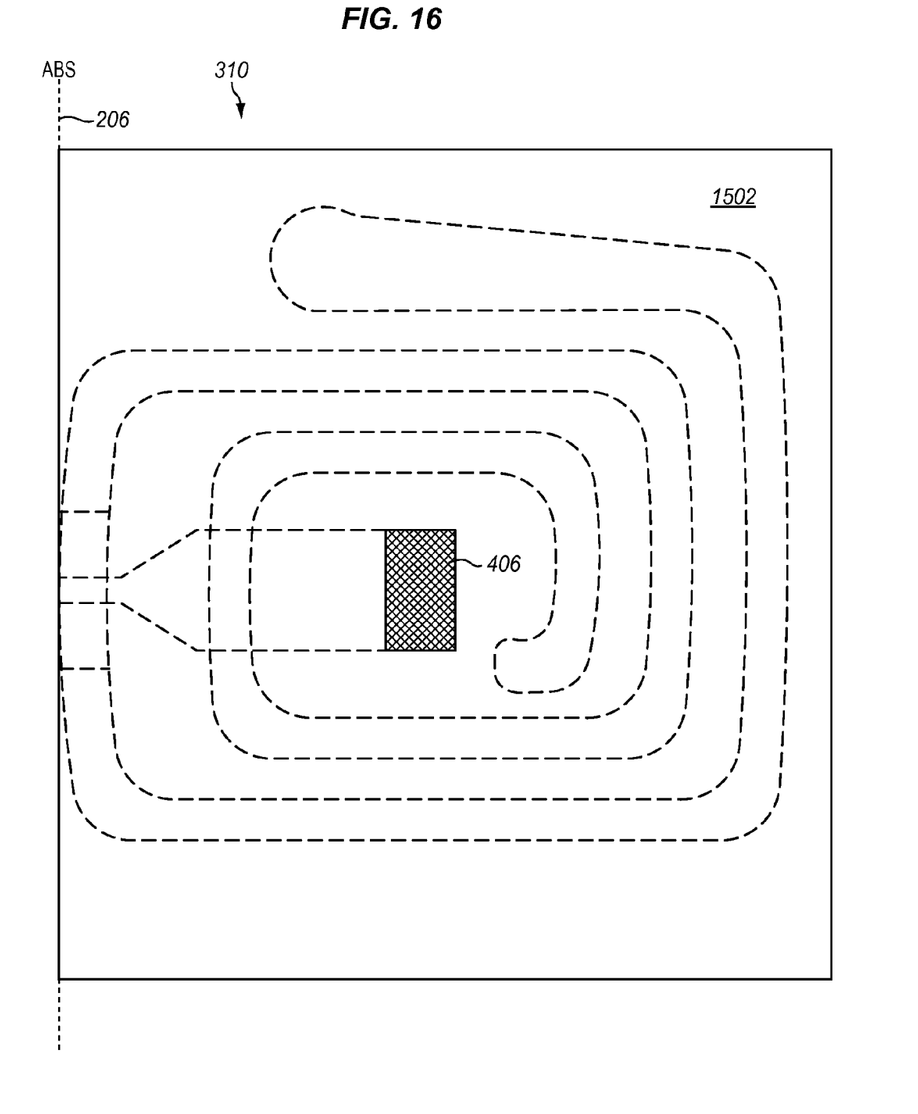
Figure 17:
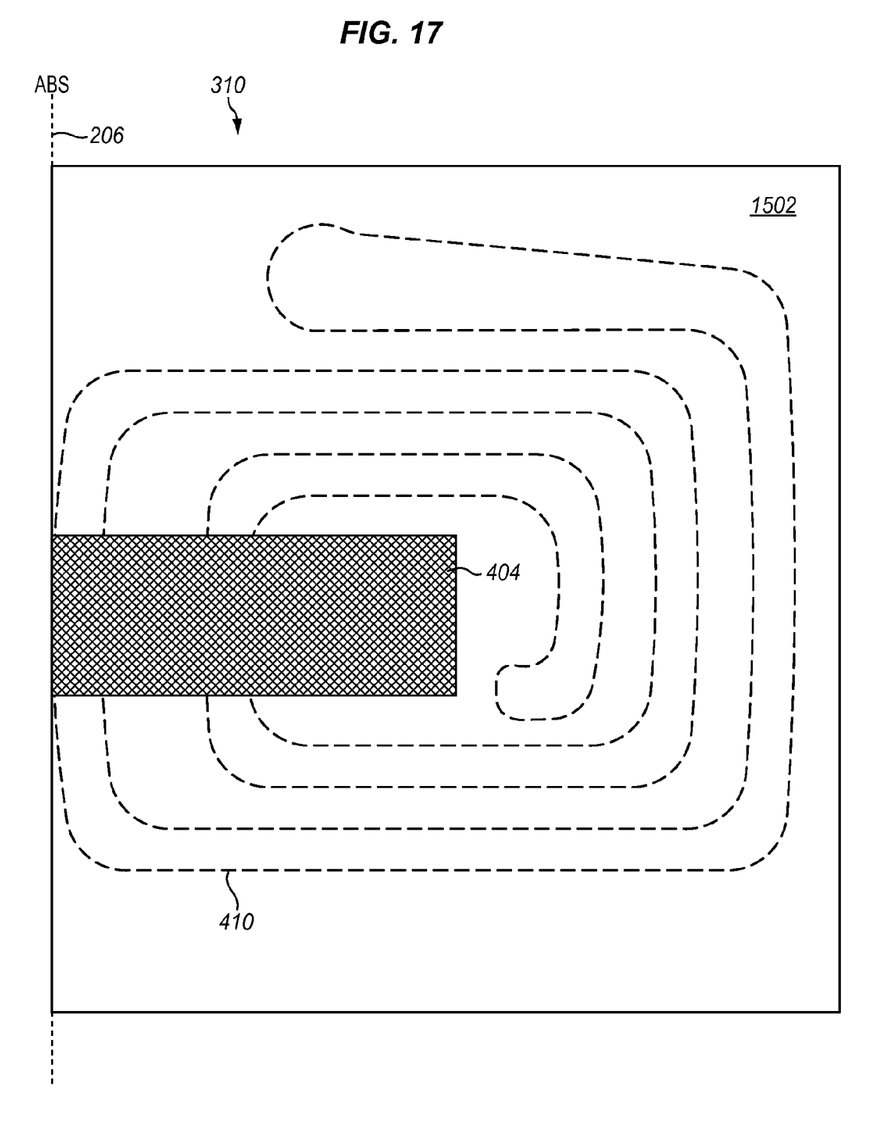

Step 912 comprises depositing insulating material on the coil 410. FIG. 15 is a top view of write head 310 being fabricated according to step 912. The insulating material 1502 covers coil 410 and back gap section 406, which are illustrated in dotted lines. Step 914 comprises removing the insulating material 1502 to expose back gap section 406. FIG. 16 is a top view of write head 310 being fabricated according to step 914. Step 916 comprises forming the return pole 404. FIG. 17 is a top view of write head 310 being fabricated according to step 916. Return pole 404 may be fabricated by plating a ferromagnetic material, such as NiFe. Return pole 404 electrically contacts the back gap section 406. Method 900 may also included additional steps to complete the fabrication of write head 310. Method 900 may also include one or more intervening steps, such as plating up taps for coil 410 or other steps.

If a bridge structure is formed such as illustrated in FIGS. 7-8, then the connecting traces 702-703 are formed in the same step 910 as forming the coil 410. The connecting traces 702-703 may be formed by patterning a coil mask to further include the connecting traces 702-703, plating Cu, Au, or another non-ferromagnetic material in the coil mask, and removing the coil mask. After depositing the insulating layer in step 912 and exposing the back gap section 406 in step 914, the bridge traces 704-705 may then be formed along with the return pole 404 in step 916.

Although specific embodiments were described herein, the scope of the invention is not limited to those specific embodiments. The scope of the invention is defined by the following claims and any equivalents thereof.

We claim:

1. A write head, comprising:
   a write pole having a pole tip exposed to an air bearing surface (ABS) of the write head;
   a return pole;
   a back gap section that connects the write pole to the return pole distally from the air bearing surface; and
   a coil formed from electrically conductive materials;
   wherein a segment of the coil is formed from a ferromagnetic material and is fabricated proximate to the air bearing surface and is formed proximate to the pole tip to act as a shield for the write pole.

2. The write head of claim 1 wherein the remaining portion of the coil is formed from a non-ferromagnetic material.

3. The write head of claim 1 wherein the coil segment is substantially centered along the length of the coil.

4. The write head of claim 1 wherein the coil segment is formed from NiFe.

5. The write head of claim 1 wherein the coil segment comprises a wrap around shield for the write pole.

6. The write head of claim 1 wherein the coil segment comprises a trailing shield for the write pole.

7. The write head of claim 1 further comprising:
   a bridge structure that electrically connects an outer end of the coil to an outer tap for the coil to extend the length of the coil between the coil segment and the outer tap.

8. The write head of claim 7 wherein the bridge structure comprises:
   a first connecting trace fabricated on the same plane as the coil and in the middle of the coil;
   a second connecting trace fabricated on the same plane as the coil;
   a first bridge trace fabricated on a different plane than the coil that electrically connects the outer end of the coil to the first connecting trace; and
   a second bridge trace fabricated on a different plane than the coil that electrically connects the first connecting trace to the second connecting trace, wherein one end of the second connecting trace comprises the outer tap for the coil.

9. A disk drive system, comprising:
   a hard disk; and
   a slider that includes a write head for writing data to the hard disk, the write head comprising:
   a write pole having a pole tip adjacent to an air bearing surface of the write head;
   a return pole;
   a back gap section that connects the write pole to the return pole distally from the air bearing surface; and
   a coil formed from electrically conductive materials;
   wherein a segment of the coil is formed from a ferromagnetic material and is fabricated proximate to the air bearing surface and is formed proximate to the pole tip to act as a shield for the write pole.

10. The disk drive system of claim 9 wherein the remaining portion of the coil is formed from a non-ferromagnetic material.

11. The disk drive system of claim 9 wherein the coil segment is substantially centered along the length of the coil.

12. The disk drive system of claim 9 wherein the coil segment is formed from NiFe.

13. The disk drive system of claim 9 wherein the coil segment comprises a wrap around shield for the write pole.

14. The disk drive system of claim 9 wherein the coil segment comprises a trailing shield for the write pole.

15. The disk drive system of claim 9 further comprising:
   a bridge structure that electrically connects an outer end of the coil to an outer tap for the coil to extend the length of the coil between the coil segment and the outer tap.

16. The disk drive system of claim 15 wherein the bridge structure comprises:
   a first connecting trace fabricated on the same plane as the coil and in the middle of the coil;
   a second connecting trace fabricated on the same plane as the coil;
   a first bridge trace fabricated on a different plane than the coil that electrically connects the outer end of the coil to the first connecting trace; and
   a second bridge trace fabricated on a different plane than the coil that electrically connects the first connecting trace to the second connecting trace, wherein one end of the second connecting trace comprises the outer tap for the coil.

17. A write head for a disk drive system, the write head comprising:
   a coil formed from electrically conductive materials;
   wherein a segment of the coil is formed from a ferromagnetic material and is fabricated proximate to an air bearing surface of the write head, and wherein the remaining portion of the coil is formed from a non-ferromagnetic material.

18. The write head of claim 17 wherein the coil segment is fabricated proximate to a pole tip of a write pole to act as a wrap around shield or a trailing shield for the write pole.

19. The write head of claim 17 wherein the coil segment is substantially centered along the length of the coil.

20. The write head of claim 17 wherein the coil segment is formed from NiFe.

21. A method of fabricating a write head, the method comprising:
   forming a write pole for the write head;
   depositing an insulating material on the write pole;
   removing the insulating material down to the write pole in the area of a back gap section;
   forming the back gap section that contacts the write pole;
   forming a segment of a coil from a ferromagnetic material proximate to an air bearing surface of the write head;
   forming the remaining portion of the coil from a non-ferromagnetic material that electrically connects with the coil segment;
   depositing insulating material on the coil; and
   forming a return pole for the write head that contacts the back gap section.

22. The method of claim 21 wherein the coil segment is substantially centered along the length of the coil.

23. The method of claim 21 wherein the coil segment is formed from NiFe.

24. The method of claim 21 wherein the coil segment comprises a wrap around shield or a trailing shield for the write pole.

25. The method of claim 21 further comprising:
   forming a first connecting trace and a second connecting trace in the same process as forming the remaining portion of the coil, wherein the first connecting trace is formed in the middle of the coil; and
   forming a first bridge trace and a second bridge trace in the same process as forming the return pole, wherein the first bridge trace electrically connects an outer end of the coil to the first connecting trace and the second bridge trace electrically connects the first connecting trace to the second connecting trace, wherein one end of the second connecting trace comprises an outer tap for the coil.

* * * * *